United States Patent
Fisher et al.

(10) Patent No.: US 8,694,694 B2
(45) Date of Patent: Apr. 8, 2014

(54) PORTABLE MEMORY DRIVE WITH PORTABLE APPLICATIONS AND CROSS-COMPUTER SYSTEM MANAGEMENT APPLICATION

(76) Inventors: Ken Scott Fisher, Los Angeles, CA (US); Kevin Cotton Baxter, Santa Clarita, CA (US)

( * ) Notice: Subject to any disclaimer, the term of this patent is extended or adjusted under 35 U.S.C. 154(b) by 0 days.

(21) Appl. No.: 12/772,935

(22) Filed: May 3, 2010

(65) Prior Publication Data

US 2011/0072167 A1  Mar. 24, 2011

Related U.S. Application Data

(63) Continuation of application No. 12/253,906, filed on Oct. 17, 2008, now abandoned, which is a continuation of application No. 10/224,746, filed on Nov. 19, 2002, now Pat. No. 7,441,108.

(51) Int. Cl.
*G06F 3/00* (2006.01)
*G06F 1/24* (2006.01)
*G06F 9/00* (2006.01)

(52) U.S. Cl.
USPC .......................................... 710/13; 713/100

(58) Field of Classification Search
None
See application file for complete search history.

(56) References Cited

U.S. PATENT DOCUMENTS

| | | | | |
|---|---|---|---|---|
| 5,270,931 A | * | 12/1993 | Appleford | 701/3 |
| 2003/0110371 A1 | * | 6/2003 | Yang et al. | 713/100 |
| 2004/0019778 A1 | * | 1/2004 | Gere | 713/2 |
| 2005/0108297 A1 | * | 5/2005 | Rollin et al. | 707/201 |
| 2006/0194549 A1 | * | 8/2006 | Janik et al. | 455/73 |
| 2009/0013165 A1 | * | 1/2009 | Chow et al. | 713/2 |

OTHER PUBLICATIONS

User Data and Setting Management, Craig Marl, Microsoft Corporation, Aug. 1, 2001 (Revised May 2002, last updated Jul. 23, 2003 and printed on Dec. 28, 2013).

\* cited by examiner

*Primary Examiner* — Kris Rhu
(74) *Attorney, Agent, or Firm* — Irell & Manella LLP

(57) ABSTRACT

A system and method for transporting the look, feel, and function of one's personalized computer preferences across multiple host computers, including the appearance, settings, programs, and user data. This system and method uses a portable memory device and a data management system that maintains a consistent interface and data file structure on multiple host computers, including a common visual desktop interface. The portable memory solution also provides mobile access to the user's applications and personal data files. The memory device is capable of being connected to multiple host computers via a standard interface such as a USB port.

39 Claims, 1 Drawing Sheet

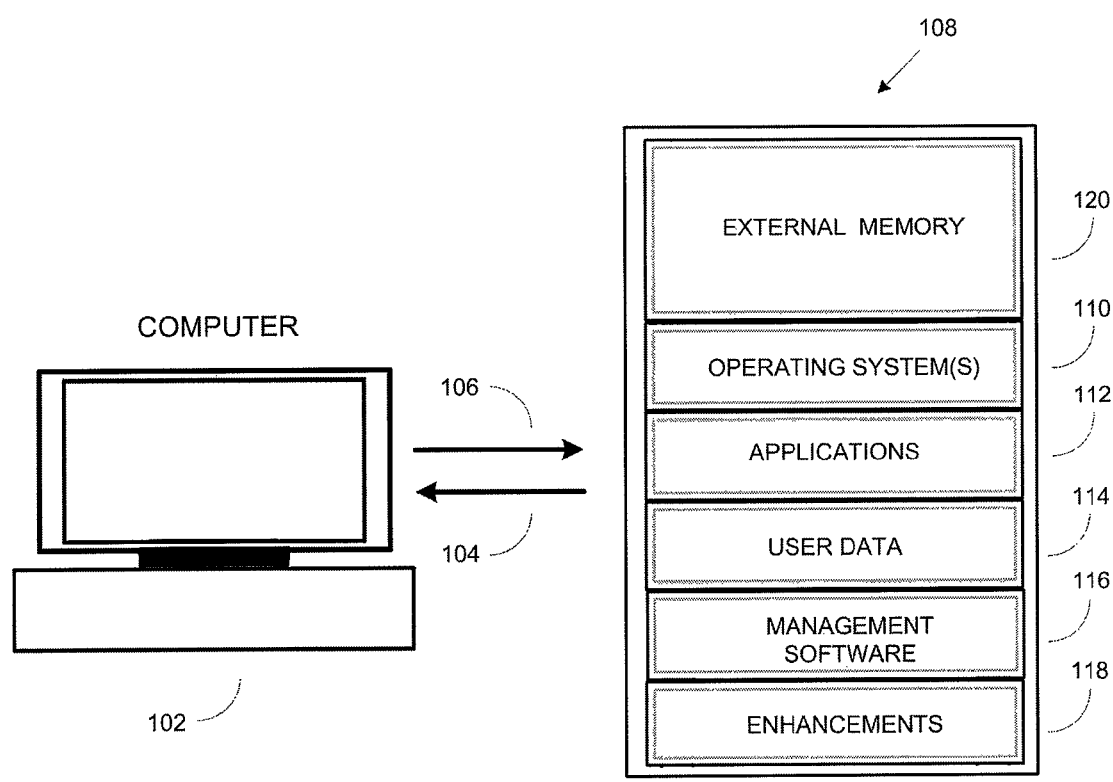

PORTABLE MEMORY DRIVE WITH PORTABLE APPLICATIONS AND CROSS-COMPUTER SYSTEM MANAGEMENT APPLICATION

CROSS-REFERENCES TO RELATED APPLICATIONS

This application is a continuation of U.S. patent application Ser. No. 12/253,906, filed Oct. 17, 2008, which is a continuation of U.S. patent application Ser. No. 10/224,746 filed Nov. 19, 2002, now U.S. Pat. No. 7,441,108. The foregoing applications are hereby incorporated by reference as if set forth fully herein.

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the data as described below and in the drawing hereto: © COPYRIGHT 2002, The Fisher Group, All Rights Reserved.

BACKGROUND

1) Technical Field of the Invention

The present invention pertains generally to the storage of digital data, and more particularly to a method and apparatus for the consistent presentation and functionality of the user interface across multiple computer systems.

2) Background of the Invention

The increasing use of multiple computers, by single individuals has revealed various problems with software applications, managing user-data, and navigating multiple user interfaces. For example, a user may work on a project on a computer at one location, and then need to take the work data to a second location. The computer at the second location may or may not, have the same applications available. If the computer at the second location has similar applications, there still may exist system incompatibilities, such as different versions of same software, missing conversion drivers (e.g., Word Perfect to Microsoft Word converters) or missing DLL files. Even if such a system has all the necessary applications, updates and drivers, it only provides software and related services, without considering the user's requirements or preferences. As a result, the system is not optimized for the user's specific needs, ease of use and/or preferences.

One such solution is a portable computer (e.g., laptop), wherein the laptop computer itself is transported from one location to another. Again, there may be compatibility issues, such as interfacing with local printers, LAN adapters, web portal access means, etc. There are also size and weight issues, wherein a much smaller data transportation device would be more advantageous. One notable feature designed primarily for laptops is their ability to suspend their current state, so-as to resume at a later time, in the exact same state and position. This so called 'hibernation' mode (also called suspend-to-disk), typically stores the computer's current RAM and video RAM data to disk. When the computer is restarted, the stored hibernation file is reloaded and all programs and documents that were open when the computer turned off are restored on the desktop.

Another commonplace solution is to use two computers, one for the desktop, and a laptop for traveling. This has created a problem wherein when a business executive returns to the office, the laptop computer used in the field may now have more recent data than the office based computer. Also, when the business executive leaves to go on a trip, the portable may be behind the desktop computer. This results in a problem of trying to know just which computer has the most current data files. In addition, the laptop and desktop computers (owned by the same individual) may also have file incompatibility issues. Sync options are available, but generally one could spend a good deal of time just tending to all the software and hardware to connect, sync and disconnect multiple computers, and one is never assured that all of the most current files, are in the correct location.

Unified interfaces have also been proposed and implemented utilizing the Internet or direct telephone access, where one's programs and data reside on remote servers, usually accessed via broadband web connections. One such embodiment is a remote access terminal system. In such a system, only the keyboard, monitor and mouse control of one computer system is typically used to remotely control a server at a second location (e.g., over a direct telephone or Internet connection). Such systems are more complex than what will be described herein, and it should also be noted that there simply exists times and places in the world where workable data connections to remote servers are either non-existent, or not practical (not to mention the associated costs). Privacy and security issues also abound.

It should also be noted that with the advent of e-mail, data management problems have only compounded: is the most current file located on web-based server? Is the file located in the temporary web download folder of the then current host computer? What about file security?

All of this points to lost time and efficiencies, security risks, and the real potential of not having immediate access to one's data, or the possibility of working on the incorrect version of the data file.

In the past, if a computer user wanted to be assured of using the same user interface, applications and data files on multiple computers, the user would literally have to transport a "bootable" hard drive from one computer to another. This of course required cabling, connectors and installation on the second system. This, in general, was not a very workable and portable approach, and also required that the drive be bootable, in order to retain such features.

Books such as Microsoft® Windows® User Experience, Microsoft Corporation, ISBN: 0-7356-0566-1, Release: Sep. 8, 1999, shows visual editing methods, programming and also details the official Microsoft® guidelines for creating well-designed, visually and functionally consistent user interfaces for applications that run on the Microsoft Windows® family of operating systems, including Windows 98 and Windows 2000. This reference source is incorporated herein by reference, in its entirety, including the chapters related to designing software so as to integrate with multiple Windows-based computer systems.

The world is now moving quickly towards truly "standard" interfaces (e.g., USB 1.1, 2.0, Firewire), which are available on many systems and platforms (e.g., Apple, PC-compatible). These new unified standards, which when properly applied, will provide considerably more options to system designers and computer programmers, so as to help eliminate the multiple problems noted above.

Flash memory is used in many devices, including video cameras, digital cameras, laptop computers, portable digital assistance devices, portable video games, portable language translators, handheld scanners, and other devices. With some host devices, the flash memory is embedded within the device itself, and others, such as portable USB flash drives, are external to the device. These ultra portable devices (e.g., flash drives, micro drives) are commonly the size of a pack of gum, and have achieved the status of "pocketability" (e.g., easily fits in one's pocket).

With such portable flash drives; a user may easily move data files from one computer to another. This is especially true with Windows Millennium edition and higher operating systems, where devices such as USB flash drives can be used in a "plug and play" fashion (without the need for any external drivers). Earlier operating systems can also benefit by the addition of adding a once-installed external driver. Such devices are ideally suited for the transportation of information, since they have no moving parts (e.g., more rugged than conventional micro drives), and are usually powered directly from the USB port (no external power or batteries). It should be noted that these devices currently make no effort to optimize a user's specific needs or preferences.

USB is of course well known in the art, and today, USB is enjoying tremendous success in the marketplace, with most peripheral vendors around the globe developing products to this specification. Virtually all new personal computers come with one or more USB ports on the box. In fact, USB has become a key enabler of the Easy PC Initiative, an industry initiative led by Intel and Microsoft to make PCs easier to use. This effort sprung from the recognition that users need simpler, easier to use PCs that don't sacrifice connectivity or expandability. USB is one of the key technologies used to provide this. Newer Apple computers systems conveniently locate a USB port on the side of the keyboard. The invention as described herein, aims to further extend this simpler, easier to use personal computer concept.

A cursory understanding of multi-user computer systems may be helpful in better defining the invention described herein. Most modern operating systems provide a multi-user environment, which means it can support numerous users, each with unique settings. A user profile is the collection of user-specific settings that define the desktop and operational environment for a particular user, including such information as start menu layout, desktop layout and icons, file view preferences, and various user configuration data files.

Users can normally customize their profiles so that any changes made during a logon session are recorded on that specific computer and used again during the next session, when the user returns to the same machine. User profiles can also be mandatory. A mandatory profile is one in which user changes are not saved. Alternatively, a network administrator can implement "roaming profiles" that follow users from one workstation to another, letting users maintain their operational environment even if their physical location changes on the network. If there's a problem with a desktop system, a user can move to another PC on the network and access their unique configuration. This allows users to access their familiar desktop and all their files while connected to the system.

Heretofore, a barrier has essentially existed for users who wish to retain the same look, "feel", and functionality as they move between multiple "non-connected" host computer systems. There would be remarkable advantages in portability, efficiencies and ease of use, if the user-defined interfaces, preferences, configuration data, software applications, data files and the like were located on an ultra-small portable memory drive that could fit on end your key chain.

As a result, a need exists in the art for a method and apparatus that provides the user with the same look, feel and operating characteristics of their "personalized" computer, across multiple computer systems (without the need for directly connecting the multiple systems). A further need exists in the art for a method and apparatus that provides a portable memory device capable of configuring multiple host computers to run software (and operating systems) located on the small extremely portable memory device. There is a further need for an improved method and apparatus that provides increased security in data transportation without being required to be connected to the Internet or otherwise expose confidential data to multiple host computers. A still further need exists for a method and apparatus that provides a flash memory solution for a host device that is capable of transmitting data via a wireless means to a host computer, thereby allowing further ease of use.

A primary object of the present invention is to provide a new, novel and useful method and apparatus, which is extremely portable and does not require the portable memory device to be bootable to maintain a consistent user interface, application access or data structure.

A further object of the present invention is to provide a method and apparatus as characterized above in which the user is provided with a data solution that stores the current state of one's machine, and is then capable of re-creating the same state on a different host computer, or the same computer at later date.

A further object of the present invention is to provide an improved method and device for users who work on multiple platforms (e.g., PC and Apple).

A further object of the present invention is to provide an improved method and device as characterized above which by its nature is more intuitive to use and thereby enhances the user's efficiency.

SUMMARY OF THE INVENTION

An integrated computer management and storage system comprising: a portable memory device; and data management software. By way of example, and not limitation, the management software provides the user with similar desktop visual depictions and system functions (e.g., customized desktop, custom control panel functions, icons, paths and drive nomenclature) across multiple host computers. This may include standardized access to user data, user preferences, file system structure, and other unified operational features.

The portable memory device and management software is integrated with a host microcomputer, via an industry standard interface (e.g., USB port, Firewire port, and/or wireless means, such as Bluetooth, or Ultra-Wideband). The inventive system combines software and hardware into an integrated system with significant performance enhancements over prior art approaches.

In a preferred embodiment, the portable memory storage device may also include common software applications (e.g., word processing, spreadsheet, etc.). This option of including application software further provides for an improved mobile data system. In one embodiment, the system is bundled with software applications configured to run on multiple computer systems. This allows the user to have access to such programs, even if they are not permanently installed on a host computer.

Any of the embodiments may have one or more "save this as a preferred interface" buttons, so as to save one or more default "preferred" setups, such that can be restored in the same state on future sessions. The button itself may be configured in software (e.g. part of the management software) or as a hardware button on the inventive device.

In another embodiment, the system includes a hibernation feature, which allows the user to save the state of the computer "as-is", e.g., by writing the host's computer RAM and settings into the portable memory devices. Such a hibernation feature is well known, and can be accomplished by one skilled in the art. Such a system allows faster restarts and, generally provides simpler usage, whereby one's common applications may always be open, and wherein one is able to pick up at the same point that one left off at, on the previous session (without having to manually restart each application and data file).

Attention needs to be paid to the real world, wherein ease of use is critical, the inventive system allows a user to move simply from one computer, to another, while at all times keeping their 'personalized' computer, and optionally letting them resume (e.g., hibernate feature) at the same exact point from a previous session. Great strides have been made to simplify user interfaces in the last several years, yet many people still struggle with computers. With the inventive system, operating a computer as stated herein would of course be much more simplified, but even more important, the operating mechanics of the computer itself would be much more transparent to the user, and thereby greatly aiding in ease of use.

Such a system can also provide increased security by containing the user's data files to a personal portable data storage solution. Data encryption, data backup schemes and password protection systems are well known in the art, and may also be included in the inventive device.

The invention is distinguished over the known prior art in a multiplicity of ways. For one thing, the invention allows the user the opportunity to initiate work, or discontinue work at their own whim as a function of time over a series of sessions on single or multiple computers, including the ability to retain the same user interface. Equally as important, however, is the ability to provide the user with the ability to resume at the same exact point on a future session on a different host computer.

In one embodiment, the portable memory device further includes a 2-way wireless (e.g., infrared, radio frequency ("RF") transceiver, including Bluetooth, and other wireless means). In such a preferred embodiment, such a RF interface may be incorporated within the memory device so as to allow it to communicate electronically via wireless means. As a result, data can be transferred to and from the memory device to a host computer without the need for direct physical connection. In one embodiment, the inventive device further comprises a mechanism, such as a micro-switch, that allows a user to initiate a wireless data transmission to the host computer. Additionally, a visual display mechanism can be provided on the memory device to show the current state of connection and data transmission. These wireless interface schemes are of course well known in the art, and as such, do not merit an in-depth discussion herein.

In yet another embodiment, the portable solution may also include an operating system (e.g., Windows, Mac OS, Linux, UNIX, etc.). It is commonplace now to have the ability to boot a computer into different operating systems. Such bootable external drives are well known in the art (e.g., floppy, CD, single hard drives) and can be accomplished by one skilled in the art. An integrated memory solution that is ultra portable, pocketable, configured for individual users, which is also bootable, would be an extremely valuable addition to the art. This approach could also allow a whole new class of low-cost computer systems, e.g., systems without a full operating system (e.g., low-cost or "thin" terminals with access means to the inventive device). Such systems could be used in airports for travelers, or installed on airplanes (e.g., in the backs of aircraft passenger seats). A user could simply plug the device system into the low-cost terminal; the operating system of their choice could already be installed on the portable device, along with their applications, data files, and system preferences. This entire approach can be designed and optimized with each user's specific requirements, preferences, and thereby allow much greater ease of use over prior art approaches. In a related embodiment, the inventive system may have a full operating system, yet this would still allow for lower cost systems with similar capabilities as outlined above.

With regard to movement of the data files themselves, the inventive system could be moved cross-platform across by a common access means (e.g. via USB ports, wireless). Also, since emulation software is well known in the art (e.g., running PC software on an Apple platform), the inventive system could further provide cross-platform emulation capabilities.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DESCRIPTION OF THE DRAWINGS

The present invention is illustrated by way of example and not by way of limitation in the figures of the accompanying drawings in which references indicate similar elements and in which:

FIG. 1 is a flow chart of the instrumentality and data flow according to the present invention.

DETAILED DESCRIPTION OF THE INVENTION

Before describing in detail the portable memory system in accordance with the present invention, it should be observed that the present invention resides primarily in what is effectively a novel combination of specific system management software and emerging memory circuits and components, and not in the particular detailed configurations thereof. Accordingly, the structure, control and arrangement of the software, circuits and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Referring to FIG. 1 there is illustrated the system overview in accordance with the present invention. Computer 102 (only one exemplary computer is shown) which may include a connector port (not shown) such as USB or Firewire (or via other communications as stated herein) for communications with the portable memory device 108. In more detail, FIG. 1 also shows the bi-directional data flow to and from the memory device 108 and the computer 102, via communications 104 and 106. Besides USB or Firewire, such communications 104 and 106 may also consist of any industry standard communications means (e.g., direct physical connection, PCMIA, Local Area Network (LAN), a Wide Area Network (WAN), the Internet, a telecommunication network and wireless options such as cellular communication, infrared, Laser, radio frequency means (RF), Bluetooth, DSSS, Ultra Wideband, wireless LAN or WAN) or other connection means. Bi-directional communications 106 and 104, may include an antenna for the wireless embodiment, as is well known in the art.

Memory device 108 provides storage for user data 114, and may also contain software applications 112. In an advanced embodiment, memory device 108 may also contain an operating system 110 designed to run on computer 102, which may be bootable. Management software 116 maintains a consistent graphical user interface on the display of computer 102. Items such as My Documents (documents save on desktop), desktop icons, desktop theme, data folders, program/data/folder shortcuts, can be remapped from computer system to computer system, so as to present the user with a familiar and personalized interface. Preferences such as file view preferences (e.g., icon or list or detail), e-mail settings, passwords, web links, web cookies, application data (e.g., data and settings on programs), task bar preferences, recent files (shortcuts from menu start\documents), click or double click preferences, screen blanking time & password protection, start menu layout, and various user configuration data files and so on, may also be stored in memory device 108, so as to allow re-configuration of a host computer to better suit the user. Additional storage as needed is taken from unused memory 120.

When the portable external memory device 108 is in communication with host computer 102, management program 116 will initiate the re-mapping process so as to reconstruct the state of the personalized user interface (e.g., desktop icons, settings, background themes, and so on). Taking a simple example, wherein a user would prefer the desktop icons 50% larger. Management software 116 may be programmed to initiate the desired multi-system preference. In this non-limiting exemplary example, the user is currently on a host machine running the older Windows 98SE operating system (OS). Management software 116 senses the current OS through commonly practiced means, and may make a backup of the Registry files first (e.g., the System.dat and User.dat). System 116 is then programmed to edit the Registry by first navigating and opening the HKEY_CURRENT_USER\Control Panel\Desktop\WindowMetrics file. The Shell Icon Size is modified within the Edit String dialog box, by changing the number on the Value data line from the default 32 pixels icon size, to the desired size of 48 pixels. After finishing the editing on the file, management software 116 saves and closes the Registry file and refreshes the system so-as to show the changes. This and other system modifying approaches are common in the programming world, and may be used to further configure the system to produce the optimized user desktop and configuration management software 116. One normally skilled in the art can accomplish this. Interface style sheets (e.g. web HTML style sheets) are well known in the art, and may be used in helping to create the personalized graphical user interface of the inventive system.

Multi user profiles, Object Linking and Embedding (OLE), drive letter assignment schemes, and roaming profiles are also well known in the art, and as such may be used to help structure the interfacing of the inventive device 108 to a host computer 102. Since multi-user profiles are extremely common in most of today's operating systems, the inventive device may interface with the host computer's OS user profile system, so as to make it "appear" that the user's personal settings had already been a "pre-existing" profile on the host system. The management software 116 may be set so as to insure that the changes made to a host computer are temporary (e.g., "mimic" a mandatory user profile, restore the pre-existing state of host computer after usage). As stated earlier, roaming profiles (e.g., networked systems) are well known on connected computer systems, and may be adapted to non-connected use, as described herein by one normally skilled in the art, with the benefit of the disclosure described herein. Object Linking and Embedding with dynamically updated links may also be used to quickly establish links between host computer 102 and portable memory solution 108.

Management software 116 may further include a hibernation feature, such a program, which on execution will save the state of computer 102 and then will write this information along with selected information (e.g., ram, video ram, programs and registry information, preferences, settings, etc.) to memory device 108. Such hibernation features are well known in the art, and the integration in the inventive device can be accomplished by one skilled in the art.

By way of non-limiting example, a business executive could work on a data file at the office, then unplug the ultra small (e.g., 81 mm×23 mm×12.5 mm) and virtually weightless (e.g. 17 g) memory device system 108 from his office computer 102, then proceed to plug the system into his home computer 102 (only one exemplary computer is shown) to continue working (picking up exactly where they left off, with the optional hibernate feature). The following morning, he or she could seamlessly continue to work on their laptop computer 102 on their flight to London. Once at the hotel, the executive could easily plug the system into a computer 102 located in the hotel's business center, and print out the finished report on the local printer. Across all the computers, the user has enjoyed the same interface, and optionally had access to their applications 112 (e.g., stored on the memory device). The management software 116 may also be programmed to sense the monitor configuration on the host device, and adjust accordingly (e.g., resize the display, resize the saved desktop data), so-as to present the data in a close representation of the preferred user-defined custom interface. It should be noted that most newer systems are using a 430 mm (17 in.) monitor.

Referring again to the executive's home computer 102; both of the executive's teenage children may each have their own memory storage system 108. Each system could be configured for their own individual usage (e.g., applications 112, graphical interface, games, etc.), with the teenagers easily moving their data and user preferences from the home computer 102, to computers 102 located in the school lab, to computers 102 located at an internet café, while at all time maintaining the same look, feel and functionality as if they were using only using a single computer, at a single location. Even the embodiment without the bundled software applications (excluding 112) would be extremely valuable in keeping one's information organized as one moved to different host computers.

Regarding the memory device 108 itself, it may be a memory card, a memory cartridge, a floppy disk, a removable hard disk, a flash memory drive, flash drive card, PCMIA memory card, a micro-drive, or the like.

Further enhancements envisioned to the memory device 108 may include an integrated microprocessor 118, a display

118, a real time clock 118, a solar cell 118 and/or a battery 118 for providing power to the device, data entry means 118, alert system 118, barcode identifier 118 and/or scanner 118, parasitic RF identification interface 118 (e.g., such as Mobil's Speed Pass), storage for personal data and credit card and/or banking information 114, personal identification 114, a flashlight 118, a sound generating device 118, an electronic voice recorder 118, a writing device 118, fingerprint 118 and/or iris acquisition scanner 118, and as a music (e.g., MP3) jukebox 114 with appropriate software 112. These foregoing enhancements could be integrated with the memory device 108, either on their own, or in any combination, and for example providing access means to doors—(e.g., direct key connect or by wireless means), automobiles (e.g., access, alarm enable or disable), buildings and the like. The combined system may also enable features such as: purchase payment means, tracking device (with integrated mini-GPS system 118), feature, identification means, illumination, traveling directions, emergency alert system, medical alert and information, dictating, writing, jukebox, time of day, reminder (e.g., programmed alarms). All such features are now commonplace and could be accomplished by one skilled in the art. Such options may or may not include some of the base components of the memory solution 108 (e.g., 110,112, 114, 116, and so on), as outlined herein.

While the present invention has been described with reference to specific exemplary embodiments, it will be apparent to those skilled in the art that various modifications and changes may be made to these embodiments without departing from the broader spirit and scope of the invention as set forth in the claims. Since modifications of the disclosed embodiments incorporating the spirit and substance of the invention may occur to persons skilled in the art, the invention should be construed to include everything within the scope of the appended claims and equivalents thereof. Accordingly, the specification and drawings are to be regarded in an illustrative rather than restrictive sense.

What is claimed is:

1. A method for transporting a user's computer environment across multiple non-connected host computers without requiring communication to a central host computer, said method comprising:
    a. providing, on a transportable USB Flash mass storage device, a roaming management application capable of configuring non-connected Windows-based host computers to run (i) transportable software user applications stored on the transportable USB Flash mass storage device, and (ii) a USB boot-capable Windows-based operating system stored on the transportable USB Flash mass storage device;
    b. enabling, upon connecting the transportable USB Flash mass storage device to any of the multiple non-connected Windows-based host computers, temporary user sessions wherein said transportable software user applications can be executed on the non-connected Windows-based host computers without permanent installation of the transportable software user applications, wherein said transportable software user applications are no longer available on the non-connected Windows-based host computer when the transportable USB Flash mass storage device is disconnected from the non-connected Windows-based host computer, thus resulting in the temporary user sessions; and
    c. loading a mobile user profile on to the transportable USB Flash mass storage device, wherein the mobilized user profile is associated with a multi-user computer network environment, and wherein the mobilized user profile is utilized to recreate at least a portion of a user's personalized computer environment without requiring connectivity to the multi-user network environment when the transportable USB Flash mass storage device is connected to one of the multiple non-connected Windows-based host computers;
    wherein said roaming management application restricts computer data files created during the temporary user sessions on said multiple non-connected Windows-based host computers from being permanently written to mass storage devices located on the multiple non-connected Windows-based host computers, and directs storage of such computer data files to the transportable USB mass storage device.

2. The method of claim 1, further comprising providing a user session hibernation feature including writing contents of a memory of the non-connected Windows-based host computer created during the temporary user sessions to the transportable USB Flash mass storage device and later recreating an existing state of the temporary user session when the transportable USB Flash mass storage device is disconnected from one of the multiple non-connected Windows-based host computers and then re-connected to the same host computer at a later time, thus resulting in the user session hibernation feature.

3. The method of claim 1, wherein the non-connected Windows-based host computers are personal computers.

4. The method of claim 3, wherein at least one of the non-connected Windows-based host computers is a laptop computer.

5. The method of claim 3, wherein the transportable USB Flash mass storage device communicates with non-connected Windows-based host computers when physically inserted into a USB port or through a local wireless link.

6. The method of claim 1, wherein said software user applications include at least two of a word processing application, a browser application, and an e-mail management application.

7. The method of claim 1, further comprising booting one of the non-connected Windows-based host computers with the USB boot-capable Windows-based operating system when the transportable USB Flash mass storage device is coupled to the non-connected Windows-based host computer during a temporary user session.

8. The method of claim 1, wherein the user's personalized computer environment includes consistent desktop visual depictions and customized system functions across the non-connected Windows-based host computers.

9. The method of claim 1, wherein the user's personalized computer environment includes consistent presentation across the non-connected Windows-based host computers of customized settings for documents saved on desktop, desktop icons, a desktop theme, data folders, and shortcuts for programs, data or folders.

10. The method of claim 1, wherein the user's personalized computer environment includes customized screen settings.

11. The method of claim 1, wherein the mobilized user profile comprises a roaming profile adapted for use in a non-connected computer environment.

12. A method for transporting a user's personalized computer environment across multiple non-connected host computers without requiring communication to a central host computer, wherein the user's personalized computer environment is associated with a multi-user network environment of connected computers whereby the user may run any of a variety of user application programs, said method comprising:

providing, on a transportable USB Flash mass storage device, a roaming management application;

providing, on the transportable USB Flash mass storage device, a USB boot-capable Windows-based operating system and portable software user applications that can be executed, under control of the roaming management application, as part of a temporary user session when the transportable USB Flash mass storage device is coupled to a Windows-based host computer that is not connected to the multi-user network environment, without permanent installation of the transportable software user applications thereon;

storing a mobile user profile on the transportable USB Flash mass storage device by which the user's personalized computer environment is recreated on the non-connected Windows-based host computer, without requiring connectivity to the multi-user network environment;

preventing user files created during the temporary user session from being permanently written to a mass storage device located on the non-connected Windows-based host computer, and directing storage of such user files to the transportable USB Flash mass storage device; and preventing the transportable software user applications from being available on the non-connected Windows-based host computer when the transportable USB Flash mass storage device is decoupled from the non-connected Windows-based host computer and the temporary user session terminates.

13. The method of claim 12, wherein the transportable USB Flash mass storage device includes a user session hibernation feature, the method including:

writing contents of a memory of the non-connected Windows-based host computer created during the temporary user session to the transportable USB Flash mass storage device to save an existing state of the temporary user session, and restoring the saved state of the temporary user session after the transportable USB Flash mass storage device has been disconnected from the non-connected Windows-based host computer and then re-connected to the same host computer at a later time.

14. The method of claim 12, wherein the non-connected Windows-based host computer is a personal computer.

15. The method of claim 12, wherein the non-connected Windows-based host computer is a laptop computer.

16. The method of claim 12, wherein the transportable USB Flash mass storage device communicates with the non-connected Windows-based host computer when physically inserted into a USB port or through a local wireless link.

17. The method of claim 12, wherein said software user applications include at least two of a word processing application, a browser application, and an e-mail management application.

18. The method of claim 12, further comprising:

initiating a second temporary user session after decoupling the transportable USB Flash mass storage device from the Windows-based host computer that is not connected to the multi-user network environment, and coupling the transportable USB Flash mass storage device to a second Windows-based host computer that is not connected to the multi-user network environment;

recreating the user's personalized computer environment on the second non-connected Windows-based host computer using the mobile user profile stored on the transportable USB Flash mass storage device, without requiring connectivity to the multi-user network environment;

preventing user files created during the second temporary user session from being permanently written to a mass storage device located on the second non-connected Windows-based host computer, and directing storage of such user files to the transportable USB Flash mass storage device; and preventing the transportable software user applications from being available on the second non-connected Windows-based host computer when the transportable USB Flash mass storage device is decoupled from the second non-connected Windows-based host computer and the second temporary user session terminates.

19. The method of claim 12, wherein the mobile user profile comprises a roaming profile adapted for use in a non-connected computer environment.

20. The method of claim 18, wherein the mobile user profile comprises a roaming profile adapted for use in a non-connected computer environment.

21. A method for transporting a network user's computer environment between computers when roaming, without requiring connection to a remote host computer, comprising the steps of:

a. connecting a portable USB flash mass storage device to a first computer that is part of a multi-user network environment of connected computers, said first computer having a Windows-based operating system and capable of creating a USB boot-capable transportable Windows-based operating system on said portable USB flash mass storage device including a host roaming management software;

b. copying said USB boot-capable transportable Windows-based operating system, a user computer environment profile, and plurality of user software applications onto said portable USB flash mass storage device;

c. disconnecting said portable USB flash mass storage device from said first computer;

d. connecting said portable USB flash mass storage device to a second computer having a pre-connection operating state and not part of the multi-user environment of connected computers;

e. from the portable USB flash mass storage device, booting said second computer with the transportable Windows-based operating system and applying said user computer environment profile to said second computer from said portable USB flash mass storage device without connecting remotely to the connected computers, while preventing computer data files from being permanently written to a non-volatile mass storage drive located within said second computer;

f. temporarily enabling the at least one software application to be run on said second computer; and g. performing a restoration procedure in said transportable Windows-based operating system wherein a current state of said first computer is restored to its pre-connection operating state prior to performing step (e).

22. The method of claim 21, wherein the portable USB flash mass storage device includes a user session hibernation feature, the method including:

writing contents of a memory of the second computer to the portable USB flash mass storage device to save an existing state of a temporary user session when the portable USB flash mass storage device is connected to said second computer; and restoring the saved state of the temporary user session after the portable USB flash mass storage device has been disconnected from the second computer and then reconnected to the second computer at a later time.

23. The method of claim 21, wherein the second computer is a personal computer.

24. The method of claim 21, wherein the second computer is a laptop computer.

25. The method of claim 21, wherein the portable USB flash mass storage device communicates with the second computer when physically inserted into a USB port thereof or through a local wireless link.

26. The method of claim 21, wherein said plurality of software user applications include at least two of a word processing application, a browser application, and an e-mail management application.

27. The method of claim 21, wherein the user computer environment profile comprises a roaming profile adapted for use in a non-connected computer environment.

28. A highly portable and secure method for transporting a user's personalized computer workstation environment to non-connected computers when roaming, without requiring connection back to the workstation's network, said method comprising:
  providing, on a transportable USB Flash mass storage device, a Windows-based operating system configured to boot multiple non-connected Windows-based host computers;
  providing, on the transportable USB Flash mass storage device, mobilized software user applications that can be executed, as part of a temporary user session on the non-connected Windows-based host computers, without permanent installation of the transportable software user applications thereon;
  providing, on the transportable USB Flash mass storage device, roaming management software including a user's profile associated with a multi-user network environment adapted to roam and be utilized in recreation of the user's personalized computer environment across the non-connected Windows-based host computers;
  preventing user files created during the temporary user session from being available on the non-connected Windows-based host computers when the transportable USB Flash mass storage device is decoupled from the non-connected Windows-based host computers and the temporary user session terminates, and directing storage of such user files to the transportable USB Flash mass storage device; and
  preventing the transportable software user applications from being available on the non-connected Windows-based host computers when the transportable USB Flash mass storage device is decoupled from the non-connected Windows-based host computers and the temporary user session terminates.

29. The method of claim 28, further comprising booting one of the non-connected Windows-based host computers with the Windows-based operating system via a USB connection when the transportable USB Flash mass storage device is coupled to the non-connected Windows-based host computers during the temporary user session.

30. The method of claim 28, wherein the transportable USB Flash mass storage device includes a user session hibernation feature, the method including:
  writing contents of a memory of the non-connected Windows-based host workstation created during the temporary user session to the transportable USB Flash mass storage device to save an existing state of the temporary user session; and
  restoring the saved state of the temporary user session after the transportable USB Flash mass storage device has been disconnected from the non-connected Windows-based host workstation and then re-connected to at least the same host workstation at a later time.

31. The method of claim 29, wherein the transportable USB Flash mass storage device includes a user session hibernation feature, the method further including:
  writing contents of a memory of the non-connected Windows-based host workstation created during the temporary user session to the transportable USB Flash mass storage device to save an existing state of the temporary user session, and
  restoring the saved state of the temporary user session after the transportable USB Flash mass storage device has been disconnected from the non-connected Windows-based host workstation and then re-connected to at least the same host workstation at a later time.

32. The method of claim 28, wherein said software user applications include at least two of a word processing application, a browser application, a spreadsheet application, a multi slide presentation application, and an e-mail management application.

33. The method of claim 29, wherein said software user applications include at least two of a word processing application, a browser application, a spreadsheet application, a multi slide presentation application, and an e-mail management application.

34. The method of claim 28, wherein the user's personalized computer environment recreated across the non-connected Windows-based host computers includes the user's desktop theme, start menu, user data files, and shortcuts for programs, data or folders.

35. The method of claim 29, wherein the user's personalized computer environment recreated across the non-connected Windows-based host computers includes the user's desktop theme, start menu, user data files, and shortcuts for programs, data or folders.

36. The method of claim 28, wherein the user's personalized computer environment recreated across the non-connected Windows-based host computers includes both user environmental settings for said Windows-based operating system and user environmental settings for said software user applications.

37. The method of claim 29, wherein the user's personalized computer environment recreated across the non-connected Windows-based host computers includes both user environmental settings for said Windows-based operating system and user environmental settings for said software user applications.

38. The method of claim 28, further comprising ensuring that the pre-existing state of the non-connected Windows-based host computers just prior to the temporary user session is restored after the temporary user session terminates.

39. The method of claim 29, further comprising ensuring that the pre-existing state of the non-connected Windows-based host computers just prior to booting the Windows-based operating system via a USB connection is restored after the temporary user session terminates.

* * * * *